(No Model.)

H. J. WELDON.
PNEUMATIC TIRE.

No. 560,246. Patented May 19, 1896.

Attest
Walter Donaldson
F. L. Middleton

Inventor
H. J. Weldon
by Ellis Spear
Atty.

UNITED STATES PATENT OFFICE.

HENRY JOSEPH WELDON, OF BROOKLYN, NEW YORK.

PNEUMATIC TIRE.

SPECIFICATION forming part of Letters Patent No. 560,246, dated May 19, 1896.

Application filed September 6, 1895. Serial No. 561,665. (No model.)

*To all whom it may concern:*

Be it known that I, HENRY JOSEPH WELDON, a citizen of the United States, residing at Brooklyn, in the county of Kings and State of New York, have invented certain new and useful Improvements in Pneumatic Tires, of which the following is a specification, reference being had therein to the accompanying drawings.

My invention relates to improvements in pneumatic tires for bicycles, and the object of the invention is to provide a tire formed of a series of independent and detachable sections so arranged that in case of injury any one may be removed and replaced without disturbing the remaining sections. I have also aimed to provide a sectional tire with air communication between the sections, whereby the air will be distributed evenly throughout the tire while it is in use.

My invention is illustrated in the accompanying drawings, in which—

Figure 1:
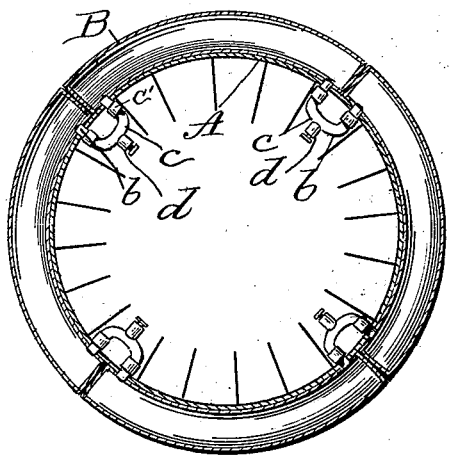
Figure 2:
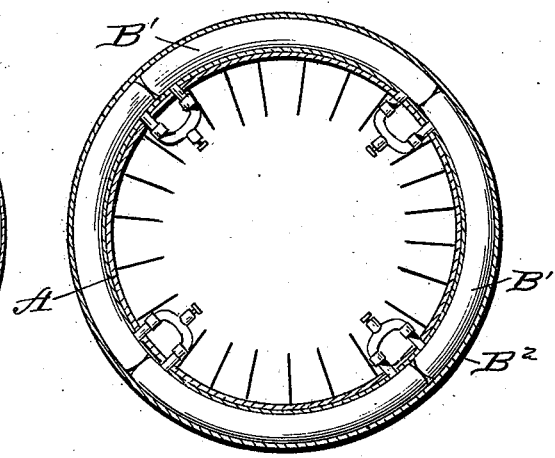
Figure 3:
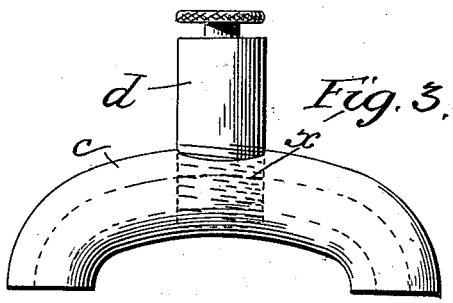
Figure 4:
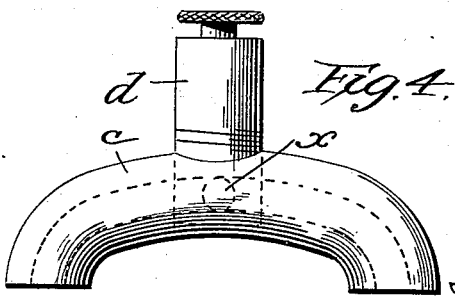

Figure 1 is a sectional view of a single-tube tire constructed in accordance with my invention. Fig. 2 is a similar view of a double-tube tire. Fig. 3 is a detail view of the valve connection between two of the sections, and Fig. 4 is a similar view showing the valve adjusted to cut off communication between two of the sections.

In the figures the rim of an ordinary bicycle is shown at A, with a pneumatic tire constructed in accordance with my invention in place thereon.

The tire may be either single or double tube as desired, and referring to Fig. 1, in which the invention is shown embodied in a single-tube tire, B B represent the independent sections of pneumatic tubing, which are secured to the rim in any desired or well-known manner. The ends are adapted to abut closely against each other, and when inflated the sections present practically a continuous surface and offer no impediment to the rotation of the wheel. Each section is provided at or near each end with a valve-tube $b$, which projects inward through the rim, and the valve-tubes $b$ of adjacent sections are connected by detachable couplings $c'$ to a coupling-pipe $c$ to permit of the detachment of the valve-tubes when the sections are to be removed. A hollow turning plug $d$ is provided, extending inwardly from this coupling-pipe, and this hollow plug is provided at its outer end with a valve of the ordinary or any desired construction by means of which air may be pumped in to fill the sections. The hollow turning plug is provided at its inner end with lateral openings $x$, which may be placed in alinement with the bore of the coupling-pipe, and when all the turning plugs are so placed air may be forced through one of the valves to fill all the sections, as there is nothing to prevent the air flowing freely from one section to another, and all the sections will be inflated to a like degree. Should, however, one of the sections become injured seriously, it is only necessary to close the turning plugs at each end of the section and detach the couplings, when the injured section may be removed without deflating or in any way interfering with the uninjured sections, and the new sections may be quickly inserted in its place.

In Fig. 2 I have shown a double-tube tire constructed in accordance with my invention in which the sections $B'$ $B'$ are surrounded by an outer covering $B^2$ of any desired or well-known form. In this case the ends of the sections may be slightly overlapped and the walls of the section are preferably made a little thicker than the ordinary inner tube, especially at the ends, so that one section may be removed without causing the blowing out of the adjacent sections. While I have shown a tire composed of four such sections in the drawings it will be understood that this number is simply representative of any number which may be desired. The sections being comparatively small, a number of them may be easily carried, and in case of a serious injury a new one may be quickly inserted in place without deflating the rest of the tire, while at the same time when the tire is in use the sections are all in communication one with another and a slight escape of air from one section will be compensated for by the flow of air from the other sections, so that the tire will at all times while in use be equally inflated in every part.

Having thus described my invention, what I claim is—

A pneumatic tire comprising a series of independent sections, valve-tubes projecting from each end of said sections, a series of couplings provided with a filling-aperture connecting said tubes, and valves arranged in said couplings whereby all or any pair of said sections can be put into communication with each other, substantially as described.

In testimony whereof I affix my signature in presence of two witnesses.

HENRY JOSEPH WELDON.

Witnesses:
E. C. CARVER,
PETER McCULLOUGH.